United States Patent [19]

White et al.

[11] Patent Number: 5,324,598

[45] Date of Patent: Jun. 28, 1994

[54] STORAGE RACK FOR DRY BATTERIES

[76] Inventors: Kenneth R. White, 56 Lakeridge Road, Winnipeg, Manitoba, Canada, R2Y 1K4; Terrence W. Smith, 5901 Rannock Avenue, Winnipeg, Manitoba, Canada, R3R 2A5

[21] Appl. No.: 967,058

[22] Filed: Oct. 28, 1992

[51] Int. Cl.$^5$ .................. H01M 2/10; H01M 2/00; H01M 2/02

[52] U.S. Cl. .................. 429/99; 429/96; 429/100

[58] Field of Search .................. 429/177, 96, 99, 100

[56] References Cited

U.S. PATENT DOCUMENTS 3,093,515  6/1963  Rector .................. 429/177

*Primary Examiner*—David B. Springer
*Attorney, Agent, or Firm*—Adrian D. Battison; Stanley G. Ade; Murray E. Thrift

[57] ABSTRACT

A storage module for household type batteries of the "AAA", "AA", "C", "D" and "9-Volt" type comprises a generally rectangular body having a front face defining vertical receptacles each for receiving one of the different types. Across the top is provided individual receptacles for the 9-Volt type. The "AAA" and "AA" volt type batteries are arranged in one vertical column and the "C" type and "D" type in two spaced vertical columns each extending to a lowermost wall so that a lowermost one of the batteries in each of these receptacles can be pulled from the receptacle with the remaining batteries sliding down to the lowermost wall.

8 Claims, 4 Drawing Sheets

STORAGE RACK FOR DRY BATTERIES

This invention relates to a storage module rack for storing dry batteries of the type generally used in household electronics.

Dry batteries have become increasingly widely used in modern society in view of the proliferation of smaller electronics and electrical devices. The average household uses large quantities of batteries of different sizes for calculators, radios, cameras, toys, remote control devices and the like.

It is often difficult to predict when the batteries will fail on a particular electronic device and accordingly there is significant frustration when the batteries fail during a time of use and the replacements are not readily available.

Battery manufacturers sell the batteries in packs of different sizes and often the pack size that is the number of batteries supplied in the pack does not match the requirement in the device concerned. This often leaves spare batteries which are simply left without any suitable storage location. The more organized household may store the batteries in a single location but in many households the spare batteries in the pack are simply lost and therefore the cost involved in purchasing those spare batteries is wasted.

It is one object of the present invention, to provide a storage module rack for batteries which can be used in a household or similar situation to maintain a proper supply of batteries of different sizes. Such a device can provide a single location where all of the spare batteries can be placed. Such a device can ensure that a proper supply is maintained in the household so that it is readily apparent when a supply of a particular size has been depleted.

According to the invention, therefore, there is provided a storage module rack for storing dry batteries comprising a plurality of dry batteries each having a battery body defining two end faces faced by a length of the battery body and a peripheral wall of a predetermined constant transverse dimension of the battery body, the batteries comprising a plurality of different sizes of batteries, each of the plurality of sizes defining a predetermined length and a predetermined transverse dimension of the battery size, and a storage body for receiving the batteries stored therein, the storage body including a plurality of receptacles defined thereon each receptacle arranged for receiving a different one of the plurality of different sizes of the batteries.

Preferably the device includes receptacles for the different sizes of batteries which are arranged in vertical side by side position so the batteries can be inserted at the top of each receptacle and slide to the bottom for removal at openings across a bottom face of the storage module. This provides a neat and attractive appearance while presenting each of the batteries in a manner which is immediately readily removable.

One embodiment of the invention will now be described in conjunction with the accompanying drawings in which FIG. 1 is a perspective view from the front of the storage module according to the present invention.

Figure 1:
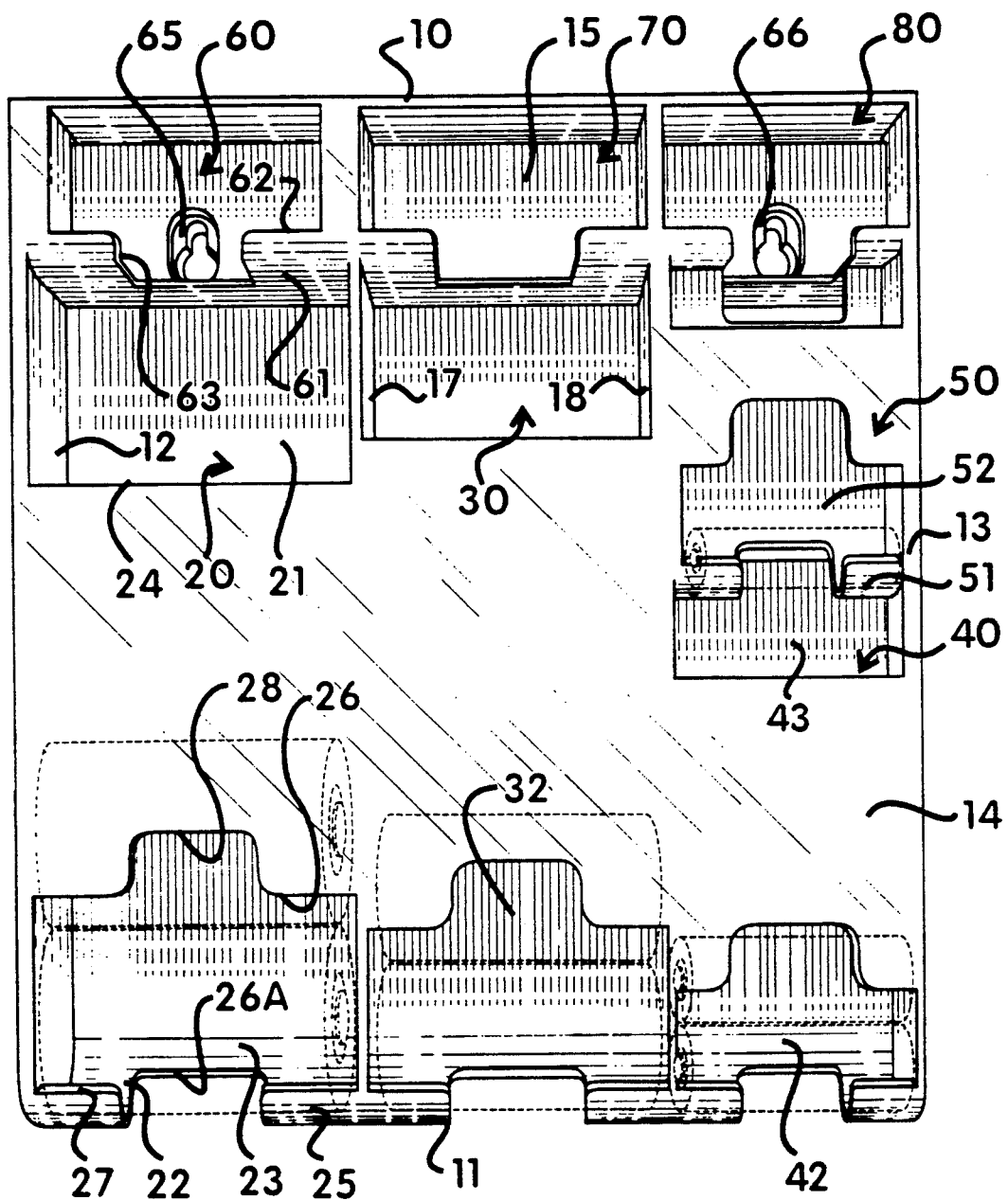

The storage body comprises a generally rectangular body structure having a top wall 10, a bottom wall 11, a first side wall 12, a second side wall 13, a front wall 14 and a rear wall 15. The front wall 14 is substantially planar defining a front face of the body. The top wall 10 is similarly planar and extends generally at right angles to the front wall. The rear wall 15 is more complex in shape as described in more detail hereinafter.

The body further includes two dividing walls 17 and 18 which are parallel to the side walls 12 and 13 and spaced therefrom. Each of the four parallel vertical walls 12, 17, 18 and 13 includes a front edge which is formed integrally with the front face and thus is coplanar with the front face and a rear edge which lies in a common plane at a rear of the body. Part of the rear wall 15 is co-planar with these rear edges so as to form a flat surface for resting against a vertical support surface. Part of the rear wall 15 is however recessed as described hereinafter.

Between the vertical walls 12 and 17 is formed a first receptacle 20 the side to side width thereof being defined by the spacing between the walls 12 and 17 and the front to rear width thereof being defined by the spacing between the front wall 14 and the rear wall 15. The receptacle thus forms a channel extending from an upper end 21 downwardly along a part of the height of the front wall to a lower end 22 at the bottom wall 11 of the module. The spacing between the walls 12 and 17 is selected to be equal to the length of a "D" type battery schematically indicated at 23. The spacing between the front wall 14 and the rear wall 15 at the receptacle 20 is arranged to be equal to the diameter of the "D" type battery. The height of the receptacle from the top end 21 to the lower end 22 is equal to the sum of the diameter of a plurality of the batteries so that the plurality of batteries can be stored in a row side to side from the top of the receptacle to the bottom wall 11 of the receptacle.

From the top of the receptacle is provided an opening 24 into which the batteries can be inserted to slide downwardly along the receptacle to the bottom wall 11. At the receptacle 20 the bottom wall 11 has a first portion 25 which has a diameter equal to the diameter of the "D" type battery. At the bottom of the receptacle is provided a further opening 26 which comprises an extraction opening through which a lowermost one of the batteries can be removed. For removal purposes, a centre portion of the lower wall 25 is omitted as indicated at 26 to allow the fingers of the user to be moved to a position grasping a part of the periphery of the lowermost battery to pull that battery forwardly over a top edge 27 of the lower wall 25 to be pulled through the opening 26 for use. The height of the opening 26 is arranged to be just left than the height of two of the batteries stacked one on top of the next so that the penultimate battery in the stack of batteries cannot simply fall out through the opening 26 as the lowermost battery is pulled forwardly. However a recess 28 in the uppermost edge of the opening 26 allows a part of the penultimate battery to be observed to ensure that there is indeed a battery and that the stack of batteries is not depleted.

Figure 5:
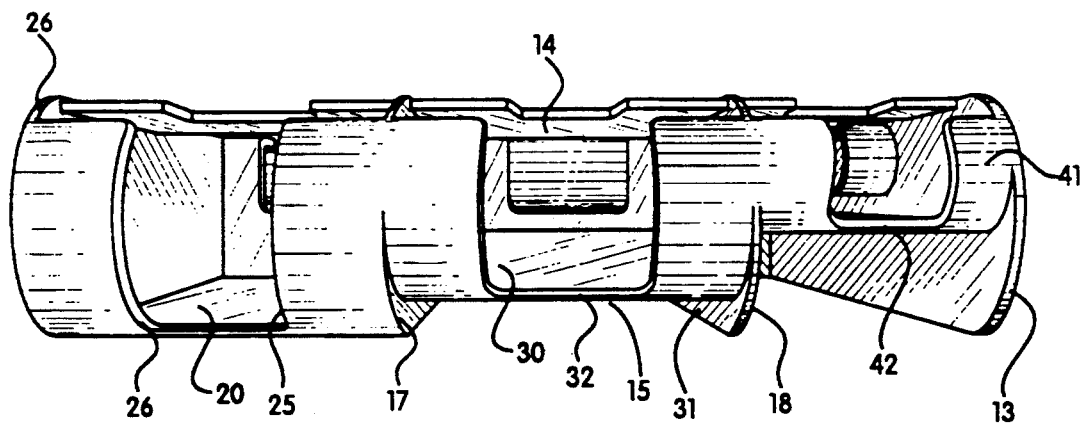
FIG. 5 is perspective view from the bottom of the module of FIG. 1.

Between the dividing wall 17 and 18 there is provided a further receptacle 30 which is shaped similarly to the receptacle 20 but is smaller in side to side width and also in front to rear width as best shown in the bottom view of FIG. 5. The receptacle 30 is thus dimensioned to receive "C" type batteries again in a stack of the batteries arranged side to side. The shape and arrangement of the receptacle 30 is identical to that of the receptacle 20 and hence these features will not be repeated. However it will be appreciated that a lower wall portion 31 of the lower wall 11 at the receptacle 30 has a smaller diameter than that of the diameter of the wall portion 25 so as to cup to smaller diameter "C" type battery. Similarly the rear wall portion 32 is spaced from the front wall by a reduced distance relative to that of the receptacle 20.

Between the dividing walls 18 and 13 are provided a yet further receptacle 40 which is substantially equal in shape and arrangement to those of the receptacles 20 and 30. The receptacle 40 includes a lowermost wall portion 41 which is again of reduced diameter to as to receive and cup a battery of the "A" type. Similarly, the rear wall portion 42 is spaced from the front wall by a distance equal to the diameter of the "AA" type battery. In view of the reduced diameter of the "AA" type batteries relative to the "C" and "D" type batteries, the height of the receptacle 40 is reduced relative to that of the receptacles 20 and 30. The lower walls is common however so that the lowermost batteries of the receptacle 20, 30 and 40 are arranged in a row across the lowermost wall 11. However, the top opening 43 of the receptacle 40 is at a reduced height relative to the top openings of the receptacles 20 and 30. This leaves room for a further receptacle 50 positioned in line with the receptacle 40 and above receptacle 40 for receiving batteries of the "AAA" type. The receptacle 50 is of the same shape and arrangement of the receptacles 20, 30 and 40 and includes a lowermost wall 51 having a diameter suitable to receive the "AAA" type battery. Similarly a rear wall portion 52 is spaced from the front wall by a distance approximately equal to the diameter of the "AAA" type battery.

Across the top of each of the receptacles 20, 30 and 50 and provided a plurality of further individual receptacles 60, 70 and 80 each shaped and arranged to receive an individual battery of the "9-Volt" type. These batteries are rectangular in shape and hence each of receptacles 60, 70 and 80 is rectangular in shape with a horizontal lower wall 61 also acting as a top wall for the receptacles 20, 30 and 50. A front edge of the lower wall 61 includes an upturned lip 62 so as to retain the battery within the respective receptacle. A centre portion of the lower wall 61 includes a cut-out portion 63 again allowing a finger grasping action on the battery within the individual receptacle.

Figure 2:
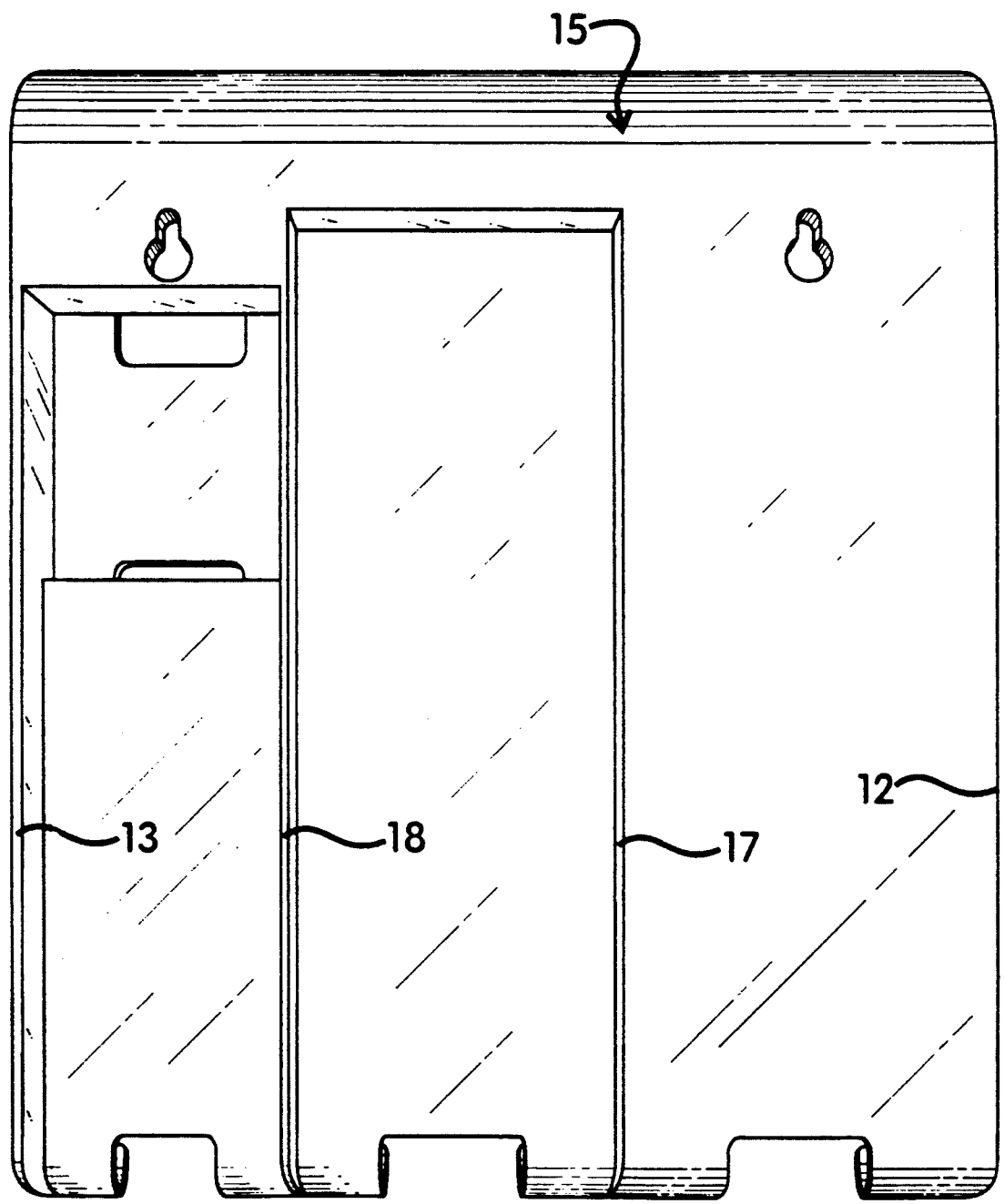
FIG. 2 is a perspective view from the rear of the module of FIG. 1.
Figure 6:
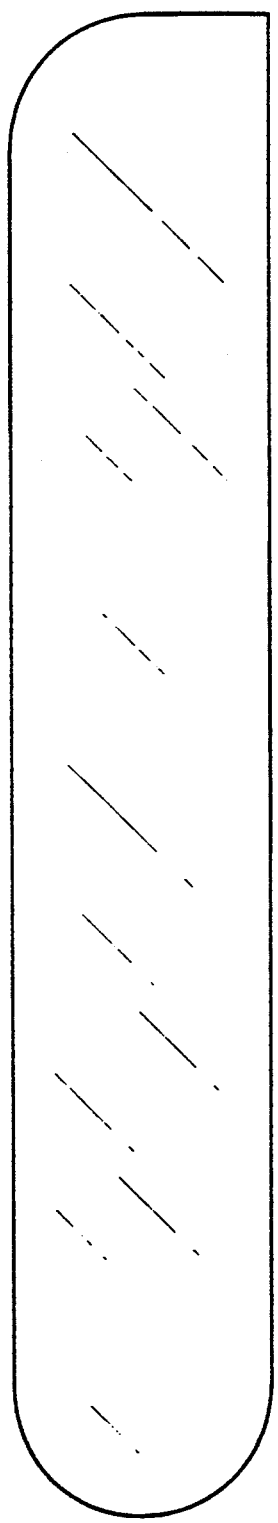
FIG. 6 is a second side elevational view of the module of FIG. 1.
Figure 3:
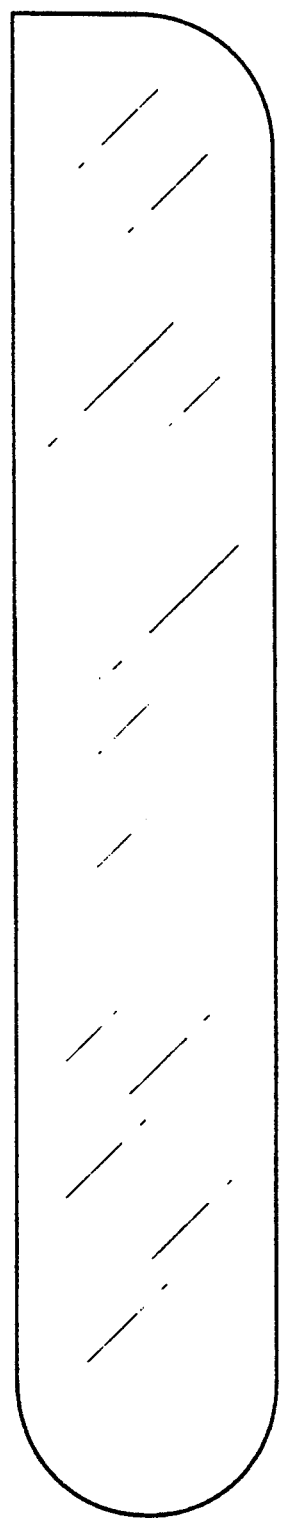
FIG. 3 is a side elevational view of a module of FIG. 1.
Figure 4:
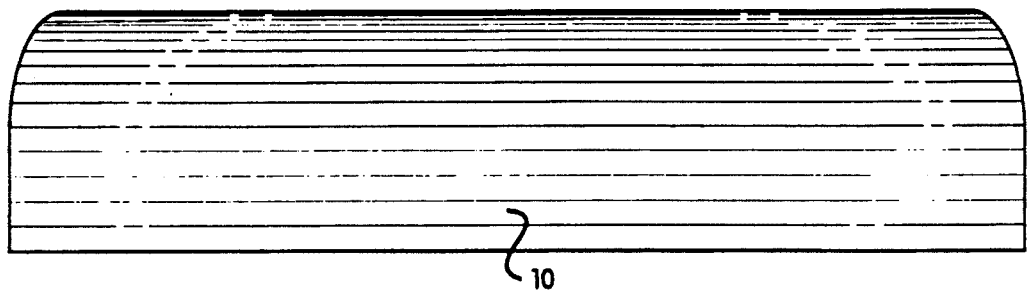
FIG. 4 is a top elevational view of the module of FIG. 1.

For attachment of the storage module to a vertical support surface there are provided a pair of key-hole shaped screw opening 65 and 66. The opening 65 and 66 are provided in the portion of the rear wall 15 aligned with the receptacles 60 and 80 and this portion of the rear wall 15 as shown in FIG. 2 is co-planar with the rear edges of the divider walls 12, 17, 18 and 13. Thus this portion of the rear wall is in contact with a vertical surface to which the storage body can be fastened by screws passed through the opening 65 and 66 conventional manner. The storage body thus enables a plurality of batteries of the types "AAA", "AA", "C", "D" and "9-Volt" to be stored in a single location. The householder can immediately see whether any of the types are depleted in quantity and therefore further supplies needing to be purchased. Spare batteries from a purchase can be simply inserted into the receptacles and made ready for use. Storage unit provides an attractive visual appearance in a unit which is relatively narrow and hence takes up little space when attached to a suitable support surface.

The support body is molded from residual plastics material as an integral element so the front walls, vertical walls and rear wall portions all are formed simultaneously in the molding process.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A household battery storage rack for storing dry batteries comprising a plurality of dry batteries each having a battery body defining two end surfaces spaced by a length of the battery body, a peripheral surface between the ends, and a predetermined constant transverse dimension, the batteries comprising a plurality of different sizes of batteries, each of the plurality of sizes defining a predetermined length and a predetermined transverse dimension of the battery size, and a storage body for receiving the batteries stored therein, the storage body including a plurality of receptacles defined thereon each receptacle having different dimensions from those of the other receptacles so as to be arranged for receiving a different one of the plurality of different sizes of the batteries.

2. The rack according to claim 1 wherein each receptacle includes wall means defining a channel along which the batteries within that receptacle can slide, the wall means being spaced so as to confine the batteries in a row to slide one after the other, the channel including a feed end thereof into which the batteries can be inserted and an extraction end thereof opposed to the feed end from which the batteries can be manually removed.

3. The rack according to claim 2 wherein the wall means are spaced by the length of the battery and are arranged to be substantially vertical so that the batteries are stored in the receptacle side by side in vertically stacked orientation.

4. The rack according to claim 2 wherein the extraction ends of each of a plurality of the receptacles are arranged in a row at a bottom of the storage body.

5. The rack according to claim 2 wherein the feed ends of the plurality of receptacles are arranged at different spacings from the extraction ends thereof.

6. The rack according to claim 3 wherein the storage body includes a front face presented forwardly of the storage body and wherein the receptacles are accessible through the front face for insertion and removal of the battery bodies, the storage body including rear face means defining between the front face and the rear face means a width of the receptacle for receiving the battery bodies, the rear face means being divided into a plurality of separate rear face portions each spaced from the front face by a different amount to accommodate the different transverse dimensions of the different sizes of batteries.

7. The rack according to claim 6 including a plurality of separate individual receptacles each for receiving a single battery body and arranged in a row across the storage body, the rear wall portion at the extra receptacles being of constant spacing from the front wall.

8. The rack according to claim 6 wherein each receptacle includes an opening in the front wall through which a lowermost one of the battery bodies can be observed and removed in a direction at right angles to the rear wall, wherein each receptacle includes a curved lowermost wall having a diameter of curvature equal to a diameter of the peripheral wall of the battery body, wherein each receptacle includes a lowermost wall on which a lowermost one of the battery bodies rests, the lowermost wall having an opening therein allowing a portion of the peripheral wall of the lowermost battery to be grasped for lifting through the opening in the front wall, and wherein the front wall includes a recess in the opening therein allowing a part only of a penultimate one of the batteries to be observed.

* * * * *